Aug. 23, 1927.
H. W. HEM
BEAM LOCKING DEVICE
Filed Dec. 17, 1923
1,640,079
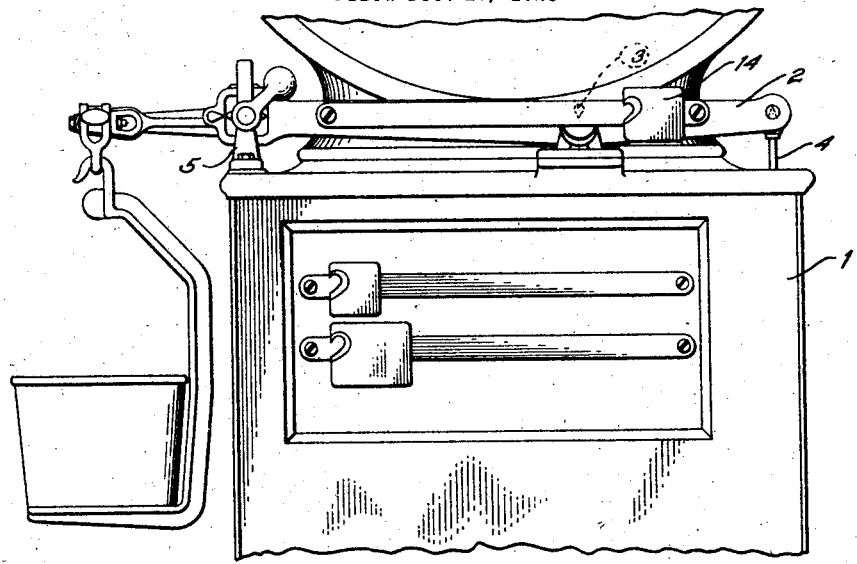
Fig. I.
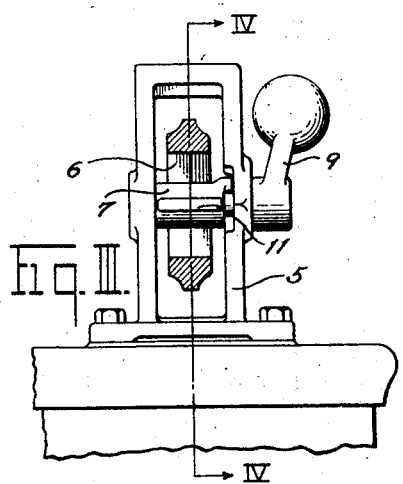
Fig. II.
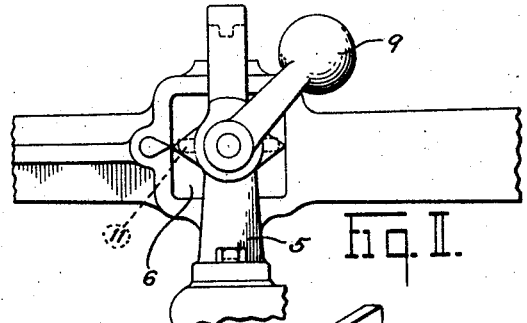
Fig. III.
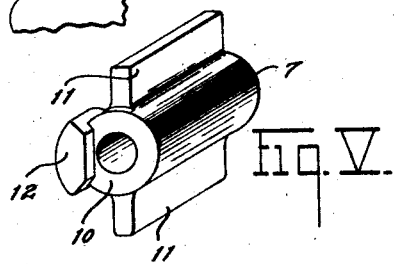
Fig. V.
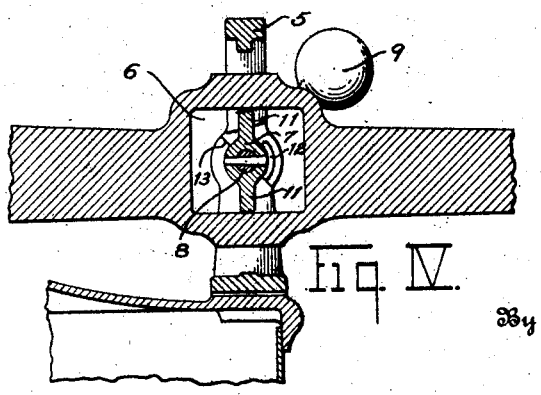
Fig. IV.
Inventor
HALVOR W. HEM
By C. W. Marshall
Attorney Patented Aug. 23, 1927.

1,640,079

UNITED STATES PATENT OFFICE.

HALVOR W. HEM, OF TOLEDO, OHIO, ASSIGNOR TO TOLEDO SCALE COMPANY, OF TOLEDO, OHIO, A CORPORATION OF NEW JERSEY.

BEAM-LOCKING DEVICE.

Application filed December 17, 1923. Serial No. 681,040.

This invention relates to weighing scales and particularly to beam locking devices therefor, and one of its principal objects is the provision of simple and effective means to bring the beam of a scale into simple or balanced position and lock it in place.

As beam locking devices are usually constructed, when the beam is locked it is forced downwardly to its lowermost position and locked there. When, therefore, the beam is unlocked, it immediately rises, whether there is any load on the scale or not, and oscillates several times before it comes to balance. If the scale is empty the operator usually can not tell whether it is properly balanced without waiting for the beam to practically stop oscillating. If the poises are set for a predetermined weight and a load is placed upon the scale and the beam then unlocked, it will immediately rise and pass through several oscillations, whether the load is slightly too heavy or not quite heavy enough. It is an object of the applicant's invention to provide a beam locking device so constructed and arranged that when a scale equipped therewith is used for weighing predetermined loads, the first movement of the lever will immediately indicate whether the load is too light or too heavy.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a fragmentary view of a scale having a lever equipped with the locking device of my invention;

Figure II is an enlarged fragmentary elevational view showing the locking device and a portion of the beam to which it is applied;

Figure III is a view taken from the left of Figure II, the lever being shown in section;

Figure IV is an elevational sectional view taken substantially on the line IV—IV of Figure III and showing the beam locking device in a locked position; and Figure V is an enlarged perspective view showing one of the elements of my device.

The scale in connection with which I have illustrated my invention is a combined weighing and counting scale of the type illustrated, described and claimed in the co-pending application of Halver O. Hem, Ser. No. 681,039, but my invention is applicable to other types of weighing scales employing beams.

In the illustrative embodiment shown a cabinet 1 supports a beam 2 which is fulcrumed at 3 and is connected to the platform lever mechanism (not shown) by means of a steel-yard rod 4. A bracket 5 is mounted upon the cabinet 1 adjacent the free end of the beam, and in the form of device shown the bracket 5 surrounds the beam 2. The portion of the beam 2 which lies within the bracket 5 is provided with an opening 6 within which lies a locking member 7.

The locking member 7 is fixed upon a shaft 8 which is journaled in the upright sides of the bracket 5 and which is provided with a handle 9 in the form of an inverted pendulum, the center of mass of which is swung from one side to the other of a vertical plane passing through the axis of the shaft 8 when the locking member 7 is turned from locked to unlocked position. The locking member is thus reliably held in the position to which it is turned.

The member 7 consists of a body portion 10 which surrounds the shaft 8 and a pair of wings 11 which, when the device is turned to lock the beam, assume the vertical position in which they are shown in Figure IV. A stop 12 engages shoulders 13 in the bracket 5 to prevent the device from turning beyond the position shown in Figure IV when the beam is locked or beyond the position shown in Figure II when the beam is unlocked.

The axis of the shaft 8 lies substantially in the horizontal plane of the fulcrum pivot 3, so that when the device is turned to the position in which it is shown in Figure IV the beam is moved to central position and held there. If, while the beam is thus locked, the poise 14 is set for a predetermined weight and a load is placed upon the scale platform and the beam then unlocked, it will immediately begin to move downwardly if the load is too light or upwardly if the load is too heavy, so that the operator knows immediately whether to add to the load or subtract from it.

The opening 6 in the beam 2 performs the function of a trig loop, so that it is unnecessary that the bracket 5 surround the beam.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a beam provided with an opening, and a pivotally movable locking device passing through said opening, said locking device having members adapted in movement to one position of the device to engage the upper and lower sides of said beam opening and move said beam to central position.

2. In a device of the class described, in combination, a beam provided with an opening, and a pivoted locking member lying in said opening, and means whereby said locking member is adapted when turned to locking position to prevent upward or downward movement of said beam.

3. In a device of the class described, in combination, a beam having an opening therein, and a pivotally mounted locking member lying within said opening, said locking member having wings adapted when said locking member is turned to locked position to engage the upper and lower sides of said opening, thus moving said beam to central position and thereafter acting as stops to prevent said beam from moving either upwardly or downwardly.

4. In a device of the class described, in combination, a beam having an opening therein, a pivotally mounted locking member lying within said opening, said locking member having wings adapted when said locking member is turned from unlocked to locked position to engage the upper and lower sides of said opening, thus moving said beam to central position and thereafter acting as stops to prevent said beam from moving either upwardly or downwardly, and means for holding said locking member in locked or unlocked position.

5. In a device of the class described, in combination, a beam having an opening therein, a bracket mounted adjacent said opening, a shaft journaled in said bracket and passing through said opening, and a locking device fixed to said shaft and lying within said opening.

6. In a device of the class described, in combination, a beam having an opening therein, a bracket mounted adjacent said opening, a shaft journaled in said bracket and passing through said opening, and a locking device fixed to said shaft and lying within said opening, said locking device having members adapted to engage the upper and lower sides of said opening, thereby moving said beam to central position.

7. In a device of the class described, in combination, a beam having an opening therein, a bracket mounted adjacent said opening, a shaft journaled in said bracket and passing through said opening, a locking device fixed to said shaft and lying within said opening, said locking device having members adapted upon turning the shaft from unlocking position to engage the upper and lower sides of said opening, thereby moving said beam to central position, a handle fixed to said shaft, and a weight on said handle adapted to hold said locking device in locked or unlocked position.

8. In a device of the class described, in combination, a beam having an opening therein, a bracket mounted adjacent said opening, a shaft journaled in said bracket and passing through said opening, a locking device fixed to said shaft and lying within said opening, said locking device having members adapted upon turning the shaft from unlocking position to engage the upper and lower sides of said opening, thereby moving said beam to central position, stop members on said bracket and said locking device respectively, said members adapted to limit the movement of said locking device, and a handle in the form of an inverted pendulum fixed to said shaft.

HALVOR W. HEM.